United States Patent [19]

Garner

[11] Patent Number: 5,402,728
[45] Date of Patent: Apr. 4, 1995

[54] LOW SHOCK SEPARATION BOLT

[75] Inventor: Eugene F. Garner, Port Hueneme, Calif.

[73] Assignee: TRW Inc., Redondo Beach, Calif.

[21] Appl. No.: 929,053

[22] Filed: Aug. 13, 1992

[51] Int. Cl.⁶ ............................................... F42B 3/00
[52] U.S. Cl. .................... 102/326; 102/223; 87/1.1; 411/19
[58] Field of Search ............... 102/319, 326, 428, 223, 102/224; 89/1.1; 411/19, 20

[56] References Cited

U.S. PATENT DOCUMENTS

| | | | |
|---|---|---|---|
| 3,503,814 | 3/1970 | Helms, Jr. et al. | 149/109 |
| 3,630,151 | 12/1971 | Rakowsky | 102/70 |
| 3,695,951 | 10/1972 | Helms, Jr. et al. | 149/19 |
| 3,728,934 | 4/1973 | Palmer | 89/1 B |
| 3,890,174 | 6/1975 | Helms, Jr. et al. | 149/44 |
| 3,983,892 | 10/1976 | Hardesty | 137/68 A |
| 3,994,201 | 11/1976 | Bendler et al. | 89/1 B |
| 4,028,990 | 6/1977 | Waide | 89/1 B |
| 4,158,322 | 6/1979 | Hardesty | 89/1 B |
| 4,239,004 | 12/1980 | Day et al. | 102/28 R |
| 4,244,386 | 1/1981 | Hardesty | 137/68 A |
| 4,248,257 | 2/1981 | Hardesty | 137/68 A |
| 4,421,005 | 12/1983 | Byrne | 89/1 B |
| 4,432,816 | 2/1984 | Kennedy et al. | 149/19.3 |
| 4,648,227 | 3/1987 | Reusch | 52/419 |
| 4,671,715 | 6/1987 | Berg | 411/8 |
| 5,115,708 | 5/1992 | Spariat et al. | 89/1.14 |
| 5,153,369 | 10/1992 | Hardt et al. | 102/223 |

*Primary Examiner*—Peter A. Nelson

[57] ABSTRACT

This invention relates to a relesable attaching apparatus for attaching a portion of a first object to a portion of a second object. The attaching apparatus has an attaching member with walls defining a cavity therein. A rapidly expanding material is placed within the cavity such that when the material is caused to expand, the attaching member will break at a failure zone located adjacent to the cavity. The rapidly expanding material is a composition that undergoes a phase change from a solid to a liquid, wherein the volume of the liquid is larger than the volume of the solid. In operation, an initiator triggers the phase change which causes a pressure build-up in the cavity, thereby loading the attaching member and causing it to break at the failure zone. Accordingly, the first and second objects are freed from one another.

19 Claims, 2 Drawing Sheets

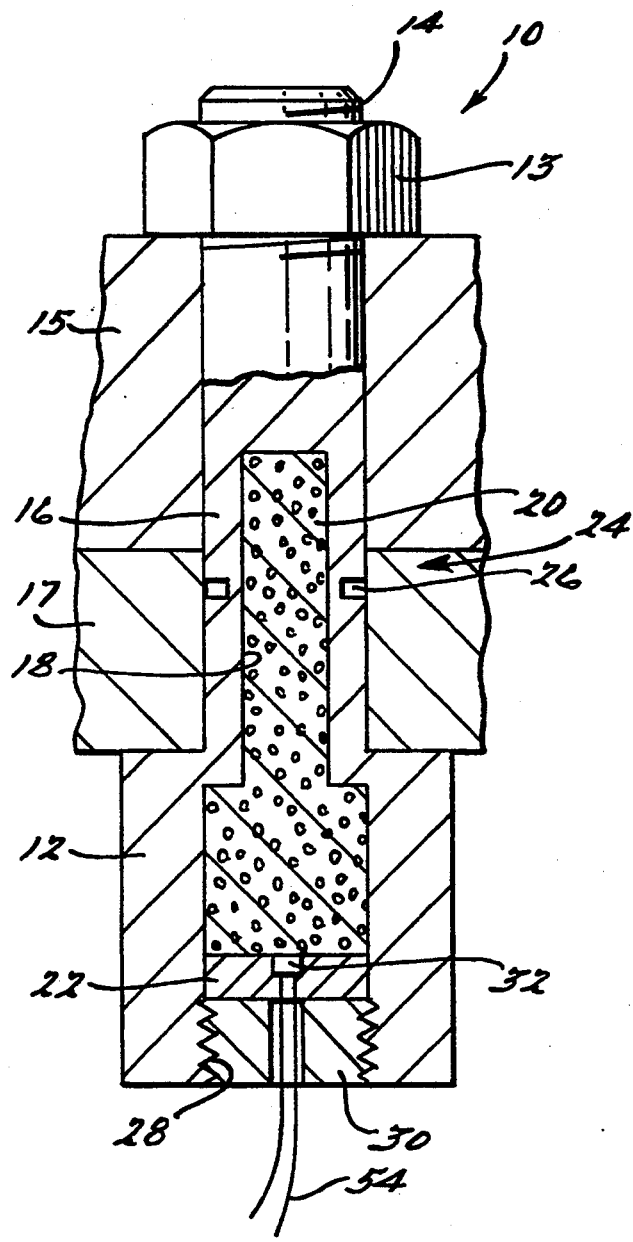
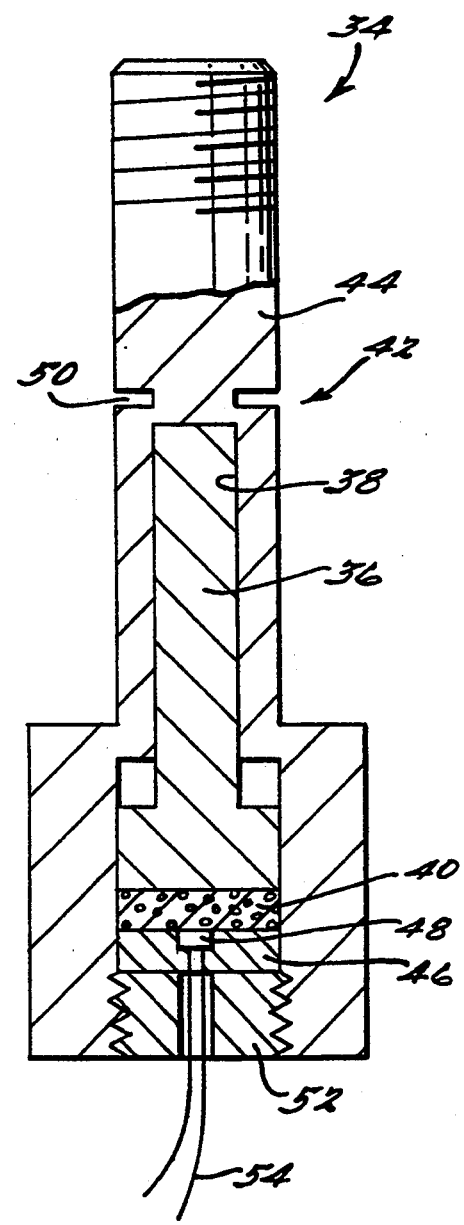
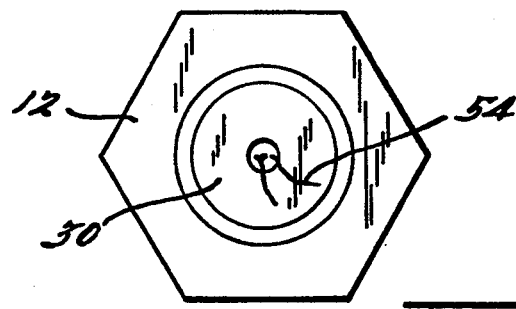

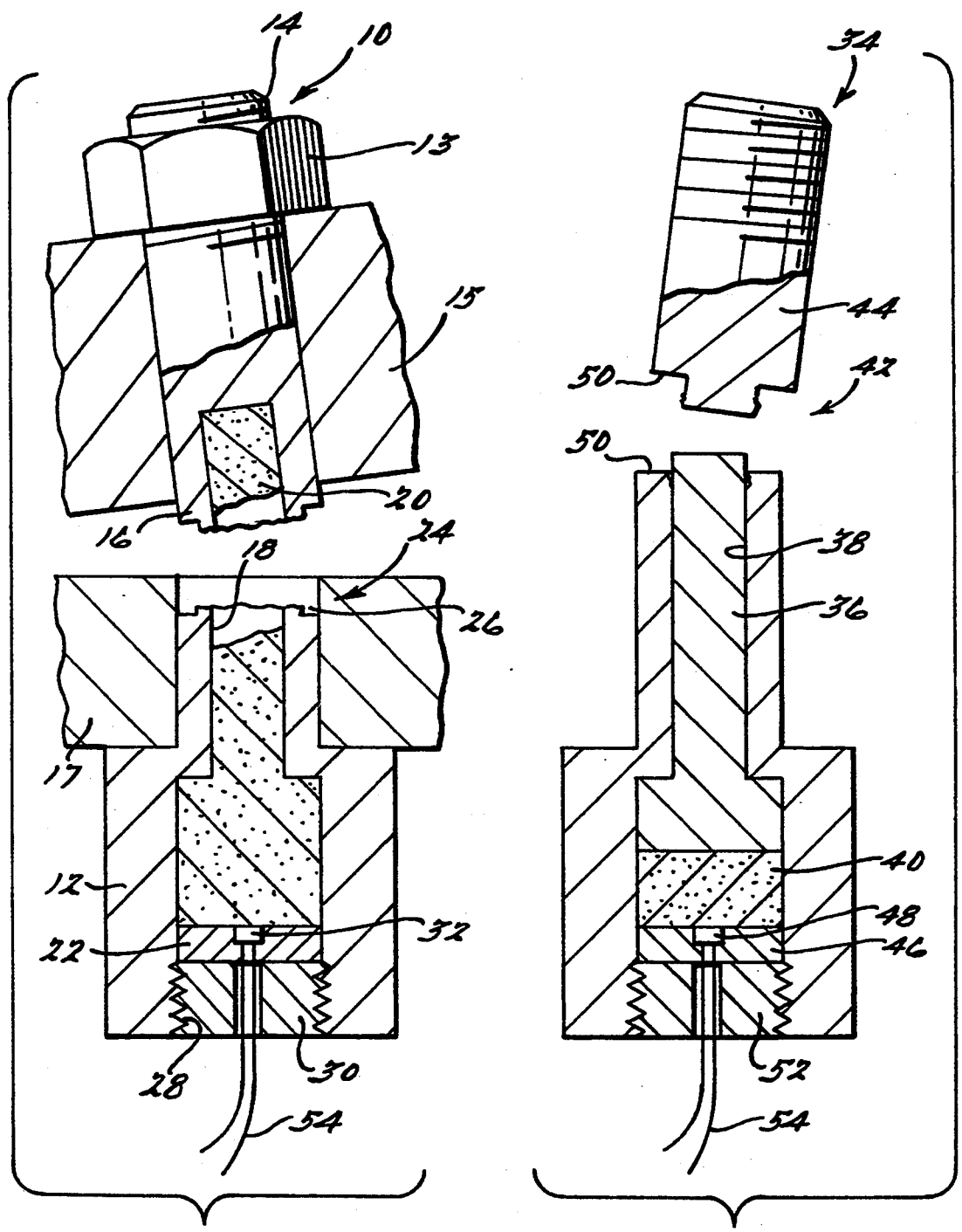

LOW SHOCK SEPARATION BOLT

BACKGROUND OF THE INVENTION

1. Technical Field

This invention relates generally to releasable attaching devices for constraining deployable elements, and more particularly to an attaching device that releases when it is broken by the force from an expanding material.

2. Discussion

Typically, releasable attaching devices are hollow bolts with a sliding piston disposed therein. The piston is rapidly accelerated within the hollow bolt by explosive pressure such that it impacts another portion of the bolt. This impact creates the necessary force to break the bolt, thereby freeing the object being restrained. One drawback to these types of devices is that piston impact can impart a considerable shock on the entire system when it strikes and shears the bolt. This shock may have an undesirable affect on any electronic components in the immediate locality of the bolt. For example, spacecraft, satellites, and the like generally employ a number of these types of attaching devices to constrain deployable elements during launch, maneuvering and during the later release of such elements. Spacecraft and satellites also generally use electronic components and other devices which may be affected by the above described shock. Therefore, it would be desirable to reduce or eliminate this shock without increasing the size, weight and complexity of the attaching device.

One solution that reduces the shock created by the piston impacting within the bolt is to place a shock absorber near the end of the piston stroke, thereby cushioning the blow of the piston. Although a shock absorber does reduce the shock imparted upon the bolt, the shock absorber itself increases the size and mass of the attaching device. Adding a shock absorber also increases the number of operative parts, thereby increasing the overall cost of the device. Therefore, it is an object of this invention to solve one or more of these problems.

SUMMARY OF THE INVENTION

In accordance with the teachings of this invention, one embodiment relates to a releasable attaching apparatus for attaching a portion of a first object to a portion of a second object. The attaching apparatus utilizes an attaching member having walls defining a cavity therein and having a failure zone adjacent to this cavity. An actuating material is placed within the cavity and is coupled to an initiator which initiates a phase change within the actuating material. The actuating material is of a composition that when it undergoes a phase change from a solid to a liquid, the volume of the liquid is larger than the volume of the solid. Accordingly, when the initiator initiates the phase change in the actuating material, the actuating material expands causing a pressure build-up within the cavity which ultimately breaks the attaching member at the failure zone.

In a further embodiment of the present invention, a loading member is slidingly disposed within the cavity. This loading member is displaced within the cavity by the expanding actuating material, thereby loading one end of the cavity near a failure zone. By utilizing a rapidly expanding material that produces minimal gases, the tremendous gas pressure build-up caused by a traditional pyrotechnic explosion is avoided. Thus, the loading member is displaced with a tremendous amount of force at a much lower velocity, thereby shearing the bolt without the associated shock. Once the attaching member is broken, the first and second objects are freed from one another.

BRIEF DESCRIPTION OF THE DRAWINGS

FIG. 1 is a cross sectional view of one configuration of a releasable attaching apparatus of the present invention;

FIG. 2 is a cross sectional view similar to FIG. 1 of another configuration of a releasable attaching apparatus of the present invention;

FIG. 3 is an end view of another embodiment of the releasable attaching apparatus of the present invention;

FIG. 4 is a cross sectional view of the releasable attaching apparatus shown in FIG. 1 with the attaching member broken in accordance with the principles of the present invention; and FIG. 5 is a cross sectional view of the releasable attaching apparatus shown in FIG. 2 with the attaching member broken in accordance with the principles of the present invention.

DETAILED DESCRIPTION OF THE PREFERRED EMBODIMENT

Referring now to the drawings, and more particularly FIG. 1, a releasable attaching apparatus 10 in accordance with the principles of the present invention is shown. The embodiment depicted in FIG. 1 illustrates a releasable attaching apparatus 10 in the form of a bolt. However, one of ordinary skill in the art would certainly recognize that various other forms may also be utilized. This bolt generally has a head portion 12 at one end and a threaded portion 14 with a nut 13 at the other end for coupling a first object 15 to a second object 17. An attaching member 16 extends between the head portion 12 and the threaded portion 14 and generally acts as a link between the first and second objects 15 and 17. As shown in FIG. 1, the attaching member 16 defines a substantially axial cavity 18 that is filled with a rapidly expandable actuation material 20. When this material 20 undergoes a reaction and expands, the material 20 is trapped within the cavity 18 by a dam member 22 causing a pressure build-up within the cavity 18. This pressure build-up imparts a tremendous force on the attaching member 16 which in turn causes the attaching member 16 to break adjacent the cavity 18 at a failure zone 24, as shown in FIG. 4. Note that the failure zone 24 is simply an area that has been weakened by a stress concentrator, such as a notch 26.

The releasable attaching apparatus 10 illustrated in FIG. 1 is easily manufactured and used. An attaching member 16, such as the shank of a bolt, is formed with a cavity 18 extending generally axially therein. This cavity 18 is exposed at the head portion 12 of the bolt via a threaded bore 28 extending from the surface of the head portion 12 inwardly to the cavity 18. Actuating material 20 is placed in the cavity 18, filling a substantial portion of the cavity 18, and a dam member 22 is placed adjacent to the actuating material 20 such that it engages the walls of the cavity 18 sealing the actuating material 20 therein. A threaded retaining cap 30 is then engaged with the threaded bore 28 in the head portion 12 to reinforce the dam member 22 and prevent it from being forced out of the cavity 18 by the expanding actuating material 20. Note that an initiator 32 extends through both the cap member 30 and the dam member 22 such that it contacts the actuating material 20. This initiator 32 is used to initiate a reaction in the actuating material 20, causing the actuating material 20 to rapidly expand and thereby break the attaching member 16, as shown in Figure 4. Note that the bolt will break at the failure zone 24 due to the use of a stress concentrating notch 26.

An alternative embodiment of the present invention is illustrated in FIG. 2. As can be seen from FIG. 2, this embodiment of the releasable attaching apparatus 34 is quite similar to that shown in FIG. 1, however, in this embodiment a loading member 36 is slidingly disposed within a cavity 38. The loading member 36 is utilized to deliver the force from an expanding material 40 to a failure zone 42, and thereby cause the attaching member 44 to shear and break. The actuating material 40 is located within the cavity 38, between a dam member 46 and the loading member 36. Accordingly, when the actuating material 40 is initiated by the initiator 48, and the expanding reaction takes place, the loading member 36 is stroked axially due to the pressure build-up, thereby shearing and breaking the attaching member 44 at the failure zone 42, as shown in FIG. 5. Note that in this embodiment, the failure zone 42 is near an end of the cavity 38 and the attaching member 44 is broken due to a shearing action caused by the loading member 36 being displaced axially toward the shear initiating notch 50.

In the various embodiments of the present invention, the unique concept is utilizing a particular fastener design in combination with an actuating material that does not produce an excess amount of gas during the phase change reaction. When an actuating material undergoes a reaction and does produce a substantial amount of gas by-product, a tremendously high pressure is generated within the cavity. By utilizing an actuating material that only undergoes a phase change from a solid to a liquid, the tremendous gas pressure build-up is avoided. Accordingly, the expansion of the actuation material as it changes from a solid to a liquid causes a more gradual pressure build-up which eventually breaks the bolt.

The actuating material utilized in the present invention can be virtually any material that expands during a phase change from a solid to a liquid in the appropriate temperature range, while producing minimal by-product gases. In general, conventional thermite compositions typically have such characteristics. A classic thermite mixture is a combination of aluminum powder and iron oxide powder which, when ignited, produces a molten mixture of iron and aluminum oxide with minimal gas by-product production. Preferably, a mixture of boron powder and nickel oxide is utilized. However, one of ordinary skill in the art would certainly recognize that any number of compositions having the above-described characteristics could suffice as an actuating material. In the preferred embodiment, boron powder and nickel oxide react to form a molten mixture of boron oxide glass and nickel that has a volume of about 35% greater than the original composition in the solid phase. The underlying mechanics of utilizing a conventional thermite material, or the like, is that the resulting reaction product is a liquid and is essentially incompressible. Thus, the expansion of the thermite will cause a more gradual pressure build-up within the cavity without sacrificing the amount of force imparted upon the attaching member.

Another advantage of using a thermite actuating material is that a reaction within the thermite is easily initiated by a conventional hot wire initiator. As shown in FIGS. 1, 2 and 3, hot wire initiators 32 and 48 are fed through the capping members 30 and 52 and the damming members 22 and 46 such that it abuts the actuating material 20 and 40. When a current is passed through the leads 54 extending from the hot wire, the hot wire heats to a temperature that triggers the exothermic phase change reaction in the actuating material 20 and 40. Thus, a phase change reaction within conventional thermite material is easily triggered by an uncomplicated conventional electro-mechanical device. One of ordinary skill in the art would certainly recognize that numerous other initiating devices could be utilized, including devices that can be controlled from a remote location relative to the attaching apparatus.

In short, the releasable attaching apparatus of the present invention provides a unique design for releasably attaching one object to another object. This attaching apparatus utilizes an actuating material that undergoes a phase change from a solid to a liquid while producing only minimal by-product gases. Accordingly, the tremendous pressure build-up associated with traditional explosion gas by-products is avoided along with the traditional shock associated therewith. By utilizing an actuating material that merely undergoes a phase change from a solid to a liquid, such as a thermite, substantial loads are delivered to the attaching apparatus without incurring the excessive gas pressure build-up. Accordingly, the attaching apparatus of the present invention is broken without imparting a shock upon the system.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

I claim:

1. A releasable attaching apparatus comprising:
    (a) an attaching member having walls defining a cavity therein and having a failure zone adjacent to said cavity;
    (b) actuating means within said cavity, said actuating means being a composition that undergoes a phase change from a solid to a liquid wherein the volume of said liquid is larger than the volume of said solid, said larger volume causing a pressure build-up within said cavity until said attaching member breaks at said failure zone; and
    (c) initiating means for initiating said phase change within said actuating means.

2. The releasable attaching apparatus of claim 1 wherein said composition is a thermite.

3. The releasable attaching apparatus of claim 1 wherein said attaching member is at least a portion of a bolt.

4. The releasable attaching apparatus of claim 1 wherein said initiating means initiates said phase change by applying heat to said composition.

5. The releasable attaching apparatus of claim 1 wherein said failure zone has a stress concentration such that the attaching member breaks within said failure zone.

6. The releasable attaching apparatus of claim 1 wherein said actuating means further includes a loading member within said cavity, said loading member being displaced by said composition such that it loads against an end of said cavity thereby breaking said attaching member at said failure zone.

7. A releasable attaching apparatus comprising:
   a) an attaching member for attaching a portion of a first object to a portion of a second object, said attaching member having walls defining a cavity therein and having a failure zone adjacent a first end of said cavity;
   b) a loading member disposed within said cavity thereby dividing said cavity into first and second portions, said first portion being adjacent said first end of said cavity, said loading member slidingly engaging with said walls defining said cavity and being capable of displacement within said cavity; and
   c) actuating means within said second portion of said cavity for actuating said loading member, said actuating means being a composition that undergoes a phase change from a solid to a liquid wherein the volume of said liquid is larger than the volume of said solid, said larger volume of said liquid causing said loading member to displace within said cavity such that said loading member applies a force to said attaching member causing said attaching member to break at said failure zone, thereby freeing said portion of the first object from said portion of the second object; and
   d) initiating means for initiating said phase change within said actuating means.

8. The releasable attaching apparatus of claim 7 wherein said composition is a thermite.

9. The releasable attaching apparatus of claim 7 wherein said initiating means is a device that provides heat to said actuating means thereby initiating said phase change.

10. The releasable attaching apparatus of claim 7 wherein said attaching member is at least a portion of a bolt.

11. The releasable attaching apparatus of claim 7 wherein said failure zone has stress concentration such that as the loading member exerts a load near the failure zone, said attaching member breaks within the failure zone.

12. The releasable attaching apparatus of claim 7 wherein said loading member is a plunger slidingly disposed within said cavity, said plunger being displaced by the, expansion of said actuating means such that an end portion of said plunger exerts a load upon said attaching member at said first end of said cavity.

13. The releasable attaching apparatus of claim 7 wherein said first object is a spacecraft and said second object is a deployable apparatus whereby said deployable apparatus remains attached to said spacecraft during launch and maneuvering of said spacecraft, said deployable apparatus being releasable thereafter.

14. A releasable fastening apparatus for fastening one object to another object, comprising:
   (a) a retaining member, said retaining member having walls defining a cavity therein;
   (b) coupling means located at each end of said retaining member for coupling said retaining member to a portion of a first object and a portion of a second object;
   (c) a loading member disposed within said cavity, thereby dividing said cavity into a first chamber and a second chamber, said second chamber being filled with a thermite composition in a solid phase; and
   (d) initiating means for initiating a phase change within said thermite type reactant such that said thermite composition substantially changes from a solid to a liquid, thereby expanding, causing said loading member to displace and load against a portion of said retaining member, thereby breaking said retaining member and freeing said first object from said second object.

15. The fastening apparatus of claim 14 wherein said retaining member is at least a portion of a bolt.

16. The fastening apparatus of claim 14 wherein said coupling means is a threaded portion of a threaded fastener.

17. The fastening apparatus of claim 14 wherein said retaining member has a failure zone having a stress concentration such that as the loading member exerts a load near the failure zone, said retaining member breaks within the failure zone.

18. The fastening apparatus of claim 14 wherein said loading member is a plunger slidingly disposed within said cavity, said plunger being displaced by the expansion of said thermite such that an end portion of said plunger exerts a load upon said retaining member at one end of said cavity.

19. The fastening apparatus of claim 14 wherein said initiating means initiates said phase change by applying heat to said thermite.

* * * * *